A. B. CADY.
Bog-Cutting Plow.
No. 205,612.           Patented July 2, 1878.
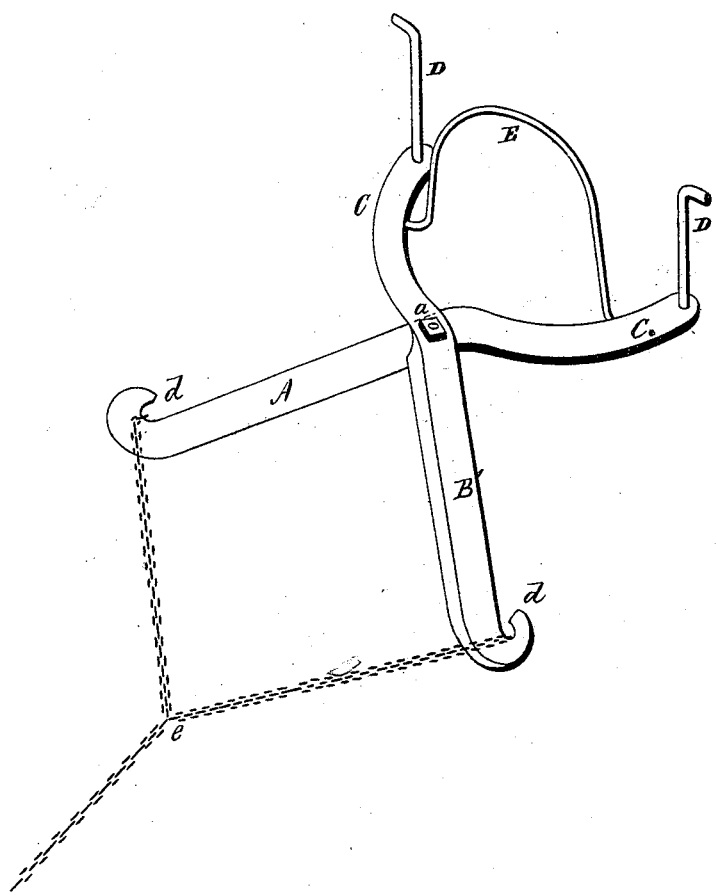

UNITED STATES PATENT OFFICE.

ARAH B. CADY, OF BETHLEHEM, CONNECTICUT, ASSIGNOR OF ONE-HALF HIS RIGHT TO FREDK. CANDEE, OF SAME PLACE.

IMPROVEMENT IN BOG-CUTTING PLOWS.

Specification forming part of Letters Patent No. 205,612, dated July 2, 1878; application filed May 13, 1878.

*To all whom it may concern:*

Be it known that I, ARAH B. CADY, of Bethlehem, in the county of Litchfield and State of Connecticut, have invented a new Improvement in Bog-Cutting Plows; and I do hereby declare the following, when taken in connection with the accompanying drawing and the letters of reference marked thereon, to be a full, clear, and exact description of the same, which said drawing constitutes part of this specification, and represents a perspective view.

This invention relates to an apparatus for cutting bogs.

Heretofore bog-cutting plows have been constructed with a cutter presenting a V shape, with the two sides rigid, depending entirely upon the draft of the plow to cut the bog.

The object of this invention is the construction of the plow so as to give to it a shear-cutting character; and it consists in a pair of shear-cutting blades hinged together, provided with handles, that the workman may control the plow, and a spring to hold the blades open, and a draft from the forward ends of the cutters, the tendency of which is to draw the forward ends together as the plow advances, and as more fully hereinafter described.

A represents one blade, B the other, the two hinged together, as at *a*, and each with an arm, C, extending rearward, similar to a common pair of shears. Each of the arms C is provided with a handle, D, of convenient form for workmen to hold, and substantially like plow-handles.

Between the handle portions a spring, E, is arranged, the tendency of which is to hold the blades in their open condition.

The forward ends of the blades are constructed with hooks *d* or other device by which the power to draw the plow may be attached, and this power is applied to both blades, but coming together, as at *e*.

In drawing the plow, when no obstruction meets it the spring E is of sufficient strength to hold the blades open against the draft; but so soon as the blades strike a bog a resistance is offered. Then the draft on the forward ends of the blades closes them together like a pair of shears, and by such closing and draft the bog is cut as if by a pair of shears, requiring very much less power than in the usual plow with stationary cutters.

I claim—

The herein-described bog-cutting plow, consisting of the pair of blades A B, hinged together, each provided with a handle, D, for holding the plow, combined with a spring to force the blades open, and a draft for the forward end of each blade to a common point, so that force applied draws the blades together, substantially as described.

A. B. CADY.

Witnesses:
GEORGE C. STONE,
E. IRVING STONE.